Patented May 4, 1943

2,318,558

UNITED STATES PATENT OFFICE 2,318,558

METHOD OF COOLING ENGINES

Arthur C. Pabst, Kew Gardens, and John H. Prall, Lynbrook, N. Y., assignors to Socony-Vacuum Oil Company, Incorporated, New York, N. Y., a corporation of New York No Drawing. Application August 7, 1940, Serial No. 351,776

10 Claims. (Cl. 252—73)

This invention relates to the use of wax emulsions, or fine dispersions of waxes in water, as cooling media for the cooling systems of internal combustion engines, and for similar uses.

The corrosive action of water, particularly hard water, on the steel, aluminum and other parts of engine blocks, has been the subject of considerable concern to engine operators for a number of years. A variety of water conditioners has been put on the market with the particular object of eliminating, or alleviating, this difficulty. In addition to true water softeners and water conditioners, there have been also offered oil emulsions obtained by diluting so called "soluble oils" in water. As an example, we may quote U. S. Patent No. 1,877,398 entitled "Process of cooling internal combustion engines," issued to Charles K. Hague, of Detroit, Michigan, assigned to the Sun Oil Company, dated September 13, 1932. This patent covers the use of soluble oil properly diluted with water. The specific emulsifier covered by Hague is a fatty acid soap.

This invention has for its object the provision of a novel cooling medium for the circulating cooling system of internal combustion engines and the like.

The present invention is directed to the use of wax emulsions as cooling media in the circulating system of internal combustion engines and the like. It has been found that wax emulsions are superior to mineral oil emulsions with respect to protection of iron, aluminum and other metals under conditions prevailing in the cooling systems of internal combustion engines.

For the purpose of this invention the term "wax emulsion" designates a wax-in-water emulsion, in other words, a fine dispersion of wax particles in water, which is assisted by an emulsifier of the soap type.

The term "wax" designates mineral wax such as paraffin wax, micro-crystalline wax, or a mixture of both, or waxes of animal and vegetable origin, such as beeswax, spermaceti, etc. It is preferable to select within the above groups a wax, or a blend of waxes, which melts below the operating temperatures in the cooling system of the engine.

The soap type emulsifier may be a soap composed of fatty acids, sulphonated fatty acids, mineral sulphonates, synthetic acids and the like, as a fatty radical, the base being a metal of the alkali group or an organic base such as tri-ethanol-amine.

The efficacy of wax emulsions can easily be demonstrated by experiments closely simulating the operating conditions in a cooling system of an internal combustion engine. This test, while not published and recognized by technical societies such as A. S. T. M., has received wide acceptance by the industry, particularly in the evaluation of various water conditioners, hydraulic fluids and corrosion inhibitors. In this test stainless steel racks holding test strips with metals usually encountered in cooling systems, are half submerged in the liquid under test and refluxed for a period of 144 hours at 160° F. Upon completion of the test, the test strips are subjected to a standard procedure for removal of any traces of the product under test. The milligrams of metal lost, are a measure of the corrosiveness to any particular metal. The metals used in this test are as follows:

Cast iron (from an automobile cylinder head of a particular make)
Aluminum alloy (from an automobile cylinder head of a particular make)
Copper
Brass
Solder It is known to those familiar with the art that cast iron and aluminum are the most vulnerable items in the series of metals listed above.

Experiment 1 demonstrates that a wax emulsion is superior to an oil emulsion. In this experiment a control test is also given on untreated tap water, which in this case is New York city water. The emulsion used in this test has substantially the following composition.

| | Per cent |
|---|---|
| 122 M. P. paraffin wax | 40 |
| Tri-ethanol-amine-fatty acid soap | 6 |
| Water | 54 |

The oil emulsion used in Experiment No. 1 has essentially the following composition.

| | Per cent |
|---|---|
| 100″ mineral oil | 40 |
| Triethanolamine stearate | 6 |
| Water | 54 |

*Experiment No. 1*

| | N. Y. city water | Loss in weight, mgrs. after 144 hrs. @ 160° F. | |
|---|---|---|---|
| | | 2% oil emulsion in N. Y. city water | 2% wax emulsion in N. Y. city water |
| | *Mg.* | *Mg.* | *Mg.* |
| Iron | 108.7 | 47.1 | 3.5 |
| Aluminum | 27.0 | 9.2 | 2.4 |
| Solder | 7.0 | 27.9 | 5.5 |
| Brass | 0.4 | 7.5 | 5.5 |
| Copper | 0.4 | 8.2 | 3.6 |

Experiment 2 demonstrates that the beneficial action of the water emulsion cannot be ascribed to the emulsifier alone and that the wax is a definitely contributing component to the anti-corrosion cooling mixture. For this test, one of the most corrosive waters, namely Wichita, Kansas, water, known for its hardness, has been selected. In this water as much soap was dissolved as wax emulsion would contain, when diluted to the working concentration. The other tests were made on the water with wax emulsion and with oil emulsions of the same composition as given in Experiment 1. It will be noted particularly that the milligrams of metal lost on cast iron and aluminum have been considerably decreased.

*Experiment No. 2*

| Wichita water plus emulsifier | Loss in weight, mgrs. after 144 hrs. @ 160° F. | |
|---|---|---|
| | 2% oil emulsion in Wichita water | 2% wax emulsion in Wichita water |
| | Mg. | Mg. | Mg. |
| Iron | 283.7 | 139.2 | 17.9 |
| Aluminum | 66.3 | 66.7 | 31.0 |
| Solder | 1.9 | 11.5 | 1.9 |
| Brass | None | 0.7 | 3.0 |
| Copper | 1.8 | 0.7 | 2.7 |

Experiment 3 demonstrates that waxes of vegetable and animal origin are the equivalent of mineral waxes from the standpoint of the present invention.

*Experiment No. 3*

| | N. Y. city water | Loss in weight, mgrs. after 144 hours @ 160° F. 2% beeswax emulsion in N. Y. city water |
|---|---|---|
| | Mg. | Mg. |
| Iron | 108.7 | 6.1 |
| Aluminum | 27.0 | 3.5 |
| Solder | 7.0 | 9.0 |
| Brass | 0.4 | 2.3 |
| Copper | 0.4 | 4.7 |

The composition of the beeswax emulsion in this experiment is exactly the same as that in Experiment No. 1 with the exception that beeswax is substituted for paraffin wax.

From this data it will be noted that we have provided a cooling medium having a high degree of non-corrosiveness to the materials of construction normally encountered in internal combustion engine cooling systems. Additionally, we have provided a medium which retains the many desirable features, such as high specific heat and low viscosity of water. The cooling medium so provided is entirely compatible with the usual antifreeze compositions in use, such as alcohols, glycerine, glycols, and the like. Additionally, when used with such antifreeze constituents the corrosion inhibiting ability of the cooling medium is retained.

These cooling media may also be compounded of wax, an emulsifying soap and any anti-corrosion agent which is compatible with the wax and emulsifying soap, such as, for example, water soluble chromates.

The ultimate percentage of wax which may be used in the cooling liquid will vary from about 0.1 to about 5.0 percent by weight of the cooling medium. The preferred amount is about 0.8 percent by weight.

We claim:

1. An aqueous heat exchange medium inhibited against corrosive action on metals comprising an emulsion of wax in water in which the wax comprises from about 0.1% to about 5.0% of said emulsion.

2. An aqueous heat exchange medium for cooling internal combustion engines inhibited against corrosive action on metals of said engine comprising a wax-in-water emulsion of wax and a soap of a fatty acid, said wax constituting from about 0.1 to about 5.0 per cent of said emulsion.

3. A method of cooling internal combustion engines and the like comprising circulating in the cooling system thereof an emulsion of wax in water in which the wax comprises from about 0.1% to about 5.0% of the emulsion.

4. A method of cooling internal combustion engines and the like and preventing corrosion of the constituent parts of the cooling system thereof comprising circulating through said cooling system an emulsion of wax in water stabilized by an emulsifying soap in which the wax comprises from about 0.1% to about 5.0% of the emulsion.

5. A method of cooling internal combustion engines and the like comprising circulating in the cooling system thereof an emulsion of paraffin wax in water in which the wax comprises from about 0.1 to about 5.0 per cent of the emulsion.

6. The method of cooling internal combustion engines and the like and preventing corrosion of the constituent parts of the cooling system thereof comprising circulating through said cooling system a wax in water emulsion comprising a paraffin wax and a soap of a fatty acid in which the wax comprises from about 0.1 to about 5.0 per cent of the emulsion.

7. The method of cooling internal combustion engines and the like and preventing corrosion of the constituent parts of the cooling system thereof comprising circulating through said cooling system a wax in water emulsion comprising a paraffin wax and a soap of a fatty acid in which the wax comprises about 0.8% by weight of the emulsion.

8. The method of cooling internal combustion engines and the like and preventing corrosion of the constituent parts of the cooling system thereof comprising circulating through said cooling system a wax in water emulsion comprising a paraffin wax and an amine soap of a fatty acid in which the wax comprises from about 0.1 to about 5.0 per cent of the emulsion.

9. A method of cooling internal combustion engines and the like and preventing corrosion of the constituent parts of the cooling system thereof comprising circulating through said cooling system a coolant comprising a water emulsion of paraffin wax stabilized by an emulsifying soap, and an additional anti-corrosive agent compatible with said soap, said wax comprising from about 0.1 to about 5.0 per cent of the emulsion.

10. An aqueous heat exchange medium inhibited against corrosive action on metals comprising a wax-in-water emulsion of paraffin wax and a soap of a fatty acid, said wax constituting from about 0.1 to about 5.0 per cent of said emulsion.

ARTHUR C. PABST.
JOHN H. PRALL.